United States Patent
Rau et al.

(10) Patent No.: US 7,086,048 B1
(45) Date of Patent: Aug. 1, 2006

(54) METHOD AND APPARATUS FOR COMBINING OPERATING SYSTEM RESOURCE DATA AND APPLICATION PROGRAM RESOURCE DATA IN A SHARED OBJECT

(75) Inventors: Lawrence R. Rau, Dublin, NH (US); Craig F. Newell, Lowell, MA (US); Frank E. Barrus, New Ipswich, NH (US); Matthew J. Catino, Windham, NH (US)

(73) Assignee: SavaJe Technologies, Inc., Chelmsford, MA (US)

( * ) Notice: Subject to any disclaimer, the term of this patent is extended or adjusted under 35 U.S.C. 154(b) by 636 days.

(21) Appl. No.: 10/287,867

(22) Filed: Nov. 4, 2002

(51) Int. Cl.
*G06F 9/44* (2006.01)

(52) U.S. Cl. ...................... 717/164; 717/106

(58) Field of Classification Search ............... 717/136, 717/162, 164, 170, 104, 105, 120, 122, 108, 717/205; 719/319, 329, 324, 331; 709/202, 709/203, 204, 226; 718/103, 104, 107; 715/700
See application file for complete search history.

(56) References Cited

U.S. PATENT DOCUMENTS

| | | | | |
|---|---|---|---|---|
| 5,247,673 A | * | 9/1993 | Costa et al. ................ | 711/205 |
| 5,421,015 A | * | 5/1995 | Khoyi et al. ................ | 718/107 |
| 5,524,253 A | * | 6/1996 | Pham et al. ................ | 709/202 |
| 5,684,955 A |   | 11/1997 | Meyer et al. | |
| 5,764,984 A | * | 6/1998 | Loucks ....................... | 719/319 |
| 5,805,899 A | * | 9/1998 | Evans et al. ................ | 717/170 |
| 6,209,021 B1 | * | 3/2001 | Ahimovic et al. .......... | 709/204 |
| 6,272,519 B1 | * | 8/2001 | Shearer et al. .............. | 718/104 |
| 6,282,702 B1 |   | 8/2001 | Ungar | |
| 6,366,876 B1 |   | 4/2002 | Looney | |
| 6,374,286 B1 |   | 4/2002 | Gee et al. | |
| 6,418,444 B1 |   | 7/2002 | Raduchel et al. | |
| 6,735,765 B1 | * | 5/2004 | Schumacher ................ | 717/164 |
| 6,842,759 B1 |   | 1/2005 | Haggar et al. | |
| 6,871,344 B1 | * | 3/2005 | Grier et al. ................. | 717/162 |
| 6,898,727 B1 | * | 5/2005 | Wang et al. ................. | 714/4 |
| 2003/0079213 A1 |   | 4/2003 | Cabillic et al. | |

OTHER PUBLICATIONS

Ravi Sharma, "Distributed Application Development with Inferno", 1999, ACM, 1-5.*
James Donahue,"Integration Mechanisms in Cedar", 1985, ACM, 245-251.*
Daniel C. Swinehart, "The Structure of Cedar", 1985, ACM, 230-244.*
"The CLDC HotSpot™ Implementation Virtual Machine," Sun Microsystems White Paper, Jun. 2002, 19 pp.
"The Java HotSpot™ Virtual Machine, V1.4.1, d2," A Technical White Paper, Sun Microsystems, Sep. 2002, 28 pp.

(Continued)

*Primary Examiner*—Wei Zhen
*Assistant Examiner*—Anna Deng
(74) *Attorney, Agent, or Firm*—Hamilton, Brook, Smith & Reynolds, P.C.

(57) ABSTRACT

Store for operating system resource data is provided integrally with application program resource data in an application program environment to create a shared object. Application programs executing the in application program environment are prevented from accessing the operating system resource data portion of the shared object.

8 Claims, 8 Drawing Sheets

OTHER PUBLICATIONS

"The Programming Language Oberon," http://www.mathematik.uni-ulm.de/oberon/reports/report-1992.html, downloaded Oct. 23, 2002, 19 pp.

"The Oberon Programming Language," http://www.engin.umd.umich.edu/CIS/course.des/cis400/oberon/oberon.html, downloaded Oct. 23, 2002, 2 pp.

"The design of the Inferno virtual machine," http://www.vitanuova.com/inferno/papers/hotchips.html, downloaded Dec. 3, 2002, 4 pp.

Dorward, S. et al., "The Inferno Operating System," http://www.vitanuova.com/inferno/papers/bltj.html, downloaded Dec. 3, 2002, 17 pp.

Swinehart, D.C. et al., "A Structural View of the Cedar Programming Environment," *ACM Transactions on Programming Languages and Systems*, vol. 8, No. 4, Oct. 1986, pp. 419-490.

Teitelman, W., "A Tour Through Cedar," *IEEE SOFTWARE*, Apr. 1984, pp. 44-73.

* cited by examiner

METHOD AND APPARATUS FOR COMBINING OPERATING SYSTEM RESOURCE DATA AND APPLICATION PROGRAM RESOURCE DATA IN A SHARED OBJECT

BACKGROUND OF THE INVENTION

This invention relates generally to management of data in a computer system, and more specifically to management of data in a computer system such that operating system resource data and application program resource data are combined in a shared object.

In conventional computer systems, operating system (OS) resources that are managed by the OS are defined and maintained in OS private data structures and referred to by application programs using a handle, or other indirect pointer mechanism. A handle is an abstraction that allows a reference to a resource to be used without allowing direct access to the contents of the object representing that resource. The application program can associate (store) this handle with its own resource data related to the operating system resource data in order to better manage operations relating to the application program resource data and the operating system resource data.

The separation of application program and operating system resource data allows the operating system to protect access to its own resource data without having to rely on the application program to protect the resource data. Typically, the operating system has insufficient knowledge of the application program environment to make assumptions of how the application program environment will operate on the data.

SUMMARY OF THE INVENTION

The present invention provides for closely integrated operating system and application program environments combining operating system resource data and application program resource data in a shared object, an exemplary integrated operating system and application program environment is described in co-pending U.S. patent application Ser. No. 10/287,856, "METHOD AND APPARATUS FOR INTEGRATING A COMPUTER APPLICATION PROGRAMMING LANGUAGE RUNTIME ENVIRONMENT WITH AN OPERATING SYSTEM KERNEL" by Lawrence R. Rau, Craig F. Newell and Frank E. Barrus, filed on Nov. 4, 2002, the contents of which is incorporated herein by reference in its entirety. The present invention provides for operating system resource data to be stored directly in a combined data structure, or object, stored in the application program environment. Cooperation, including managing access to the combined data structure, is provided, allowing the operating system resource data to be stored with the application program resource data, but preventing the application program from accessing the operating system resource data.

The present invention provides a method for combining operating system resource data and application program resource data in a shared object by storing the operating system resource data integrally with the application program resource data in an application program environment to create the shared object. Access to an operating system resource data portion of the shared object is provided to processes executing in the operating system environment. Furthermore, access to the operating system resource data portion of the shared object is controlled such that access by processes executing in the application program environment is prevented.

In one embodiment of the present invention, the shared object is defined statically by defining an application program resource data and operating system environment object relative to an application program environment development language. The application program environment and operating system environment object is compiled to produce an application program environment binary object. An application program environment and operating system environment object definition is generated in operating system environment development language, from the application program environment binary object. That generated application program environment and operating system environment object definition is compiled to produce an operating system environment binary object.

The operating system resource data portion of the shared object is viewed as a valid object from the processes executing in the operating system environment. The application program resource data portion of the shared object is also viewed as a valid object from the processes executing in the application environment.

In another preferred embodiment of the present invention a method for storing operating system resource data in a shared object provides for storing the operating system resource data in an application program environment to create the shared object. Access to the shared object is provided to processes executing in the operating system environment, prevented by processes executing in the application program environment.

Reductions in memory usage and processing are achieved by the present invention for operating system data resources and application program data resources that would have been split between the two environments in the prior art. The present invention provides for a combined data structure that is smaller than the two separate data structures that it encompasses. Processing is reduced as only a single reference to the combined data structure need be passed between the operating system environment and the application program environment. Alternately, if the actual data structure were passed between the operating system environment and the application program environment, processing to copy the data as well as memory to store the copy would be required.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. The present invention provides for storing operating system resource data integrally with application program resource data in an application program environment to create a shared object, while also preventing an application program from accessing the operating system resource data portion of the shared object.

Each operating system environment and application program environment is provided with a valid view of the data. Therefore, operating system processes and application program processes can access and operate on the shared object as if it were owned by the respective process. This reduces, or can eliminate, the need for code changes in the various operating system and application program processes accessing the shared object.

Access to the shared object is controlled from each environment. In this way, application program processes are prevented from accessing operating system resource data, even though the operating system resource data is actually stored in the application program environment.

Creation and collection of the combined data structure, or object, is managed by processes within the application program environment. In one preferred embodiment of the present invention a "synthetic" shared object is created. This synthetic shared object is defined in a similar fashion as a standard shared object, but is created by an operating system process and can only be operated on by operating system processes. Application program processes do not directly access these synthetic shared objects. Although the application program processes may store them and pass them to and from operating system processes.

Figure 1:
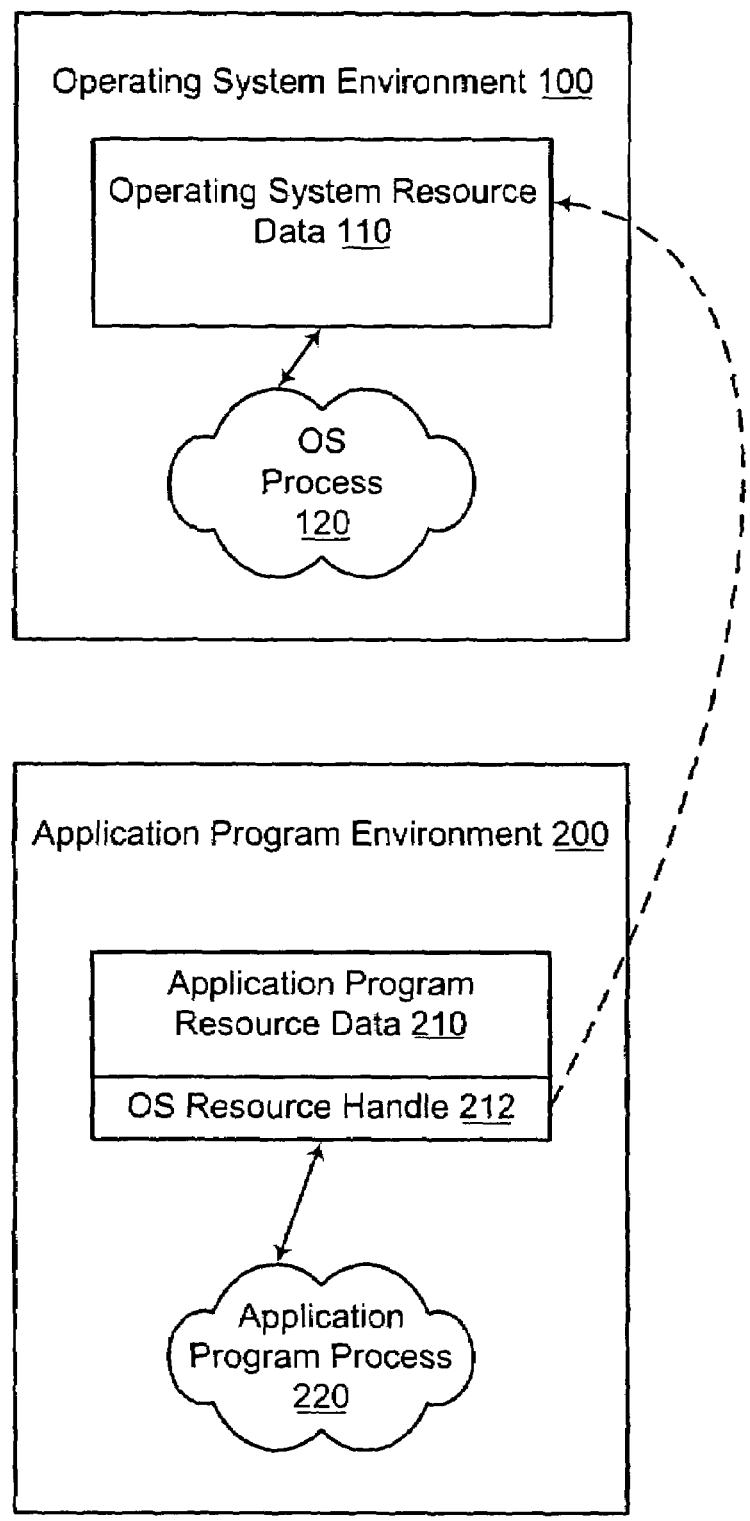
FIG. 1 is a diagram of operating system resource data and application program resource data configured according to the prior art.

FIG. 1 is a diagram of operating system resource data 110 and application program resource data 210 configured according to the prior art. An operating system (OS) process 120 executes within an operating system environment 100. The OS process 120 has access to operating system resource data 110 created within the operating system environment 100.

An application program process 220 executes within application program environment 200. The application program process 220 has access to application program resource data 210. Application program resource data 210 may include an indirect pointer, or "handle" (e.g., OS resource handle 212) to operating system resource data 110. The handle allows application program process 220 to indirectly reference resources in operating system resource data 110 without allowing direct access to operating system resource data 110. Because two separate resource data structures (e.g., operating system resource data 110 and application program resource data 210) are used to manage a related resource (e.g., a graphical user interface window) data redundancy is created. Redundant data creates potential data integrity problems as well as requiring more memory to store and processing to manage the data.

Figure 2:
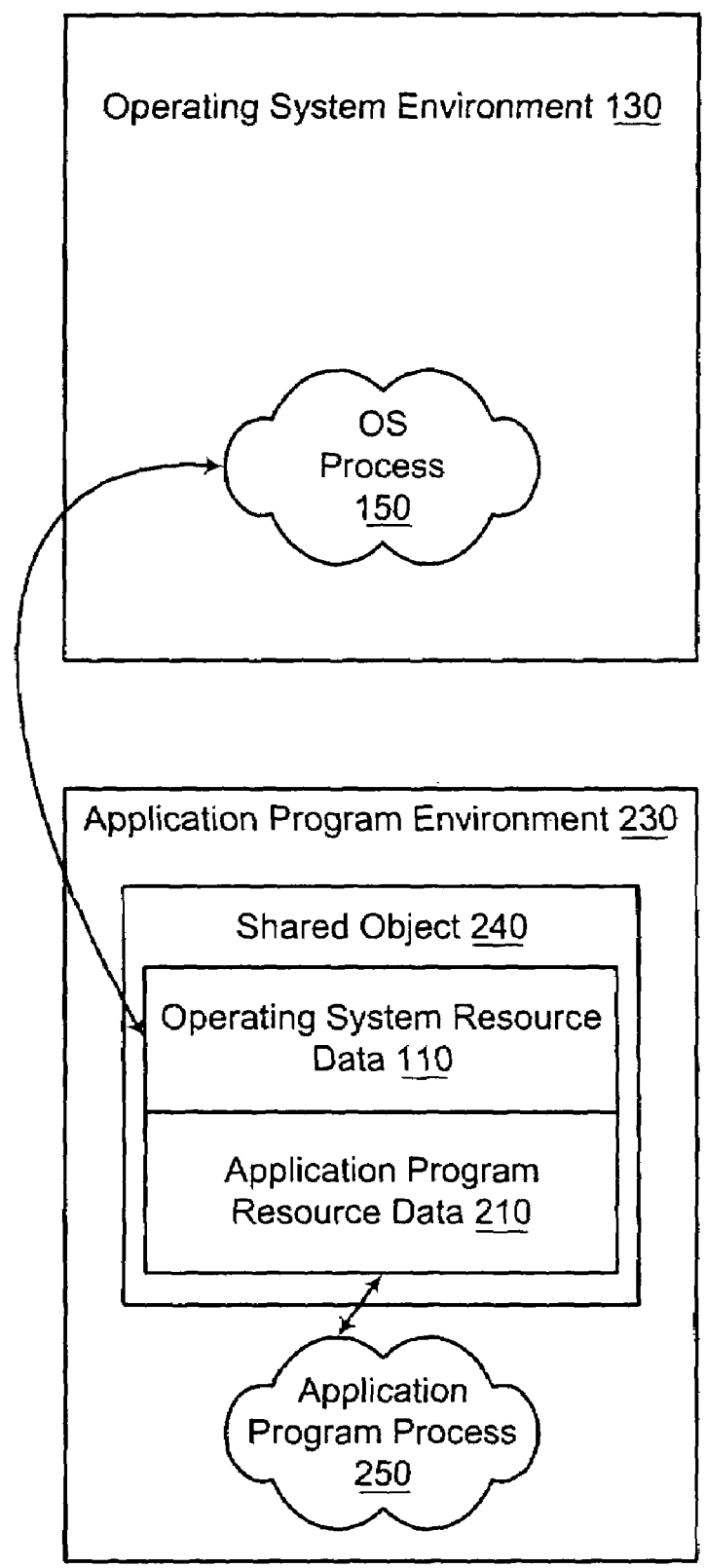
FIG. 2 is a diagram of operating system resource data and application program resource data configured according to an embodiment of the present invention.

FIG. 2 is a diagram of operating system resource data 110 and application program resource data 210 configured according to an embodiment of the present invention. A shared object 240 is created by combining operating system resource data 110 and application program resource data 210. The present invention provides access to the application program resource data 210 portion of shared object 240 by application program process 250, but prevents access to the operation system resource data 110 portion of shared object 240 by application program process 250. OS process 150 executing in operating system environment 130 has direct access to the operating system resource data 110 portion of shared object 240 in application program environment 230. In this way redundant data storage is decreased, thereby reducing memory usage and the possibility of data integrity problems while also reducing processing required to manage the combined data in shared object 240.

Figure 3:
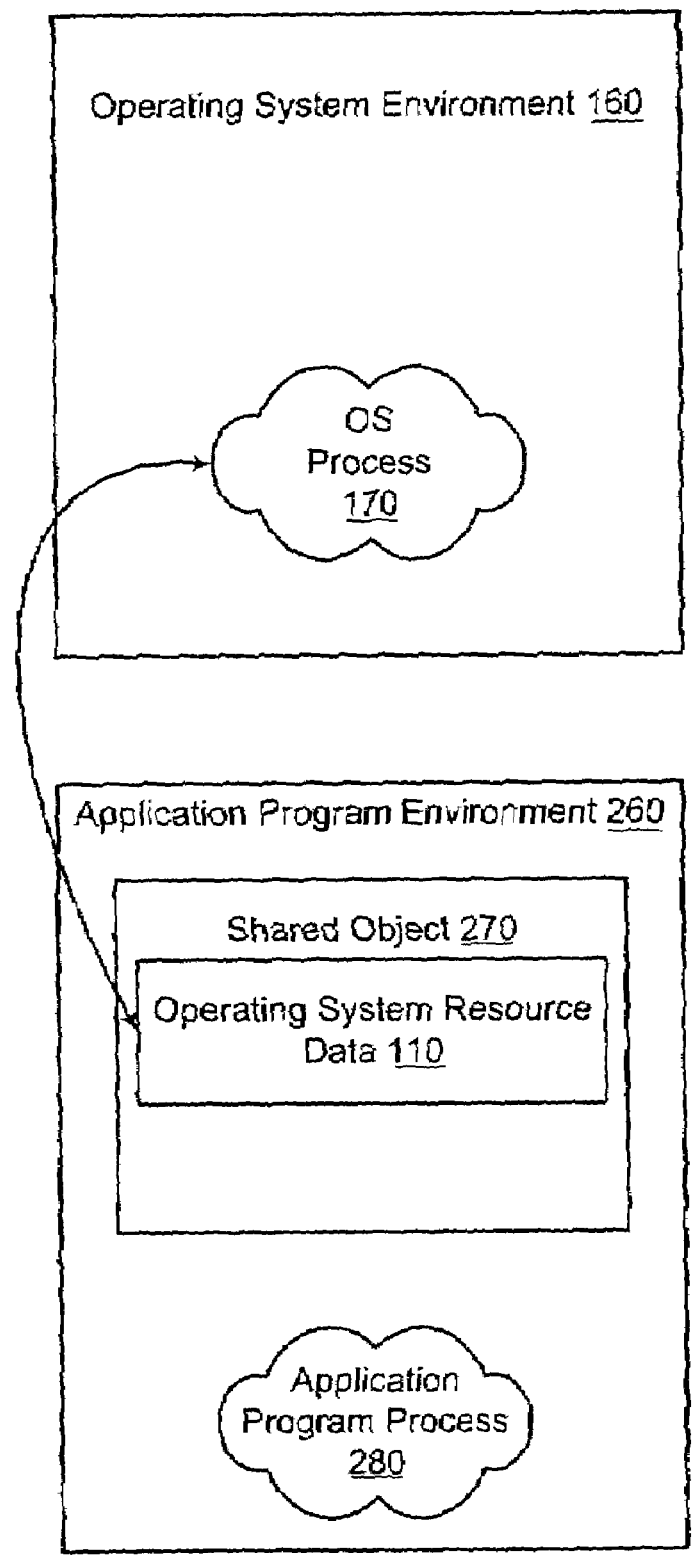
FIG. 3 is a diagram of operating system resource data configured according to an embodiment of the present invention.

FIG. 3 is a diagram of operating system resource data 110 configured according to an embodiment of the present invention. In this embodiment, a shared object 270 is created in the application programming environment 260 and contains operating system resource data 110. Shared object 270 can be accessed by operating system process 170, but is prevented from being accessed by application program process 280. The shared object 270 is referred to as a "synthetic" object. Similar operating system process 170 code is used to manage both synthetic shared objects 260 and standard shared objects 240 in much the same way.

Figure 4:
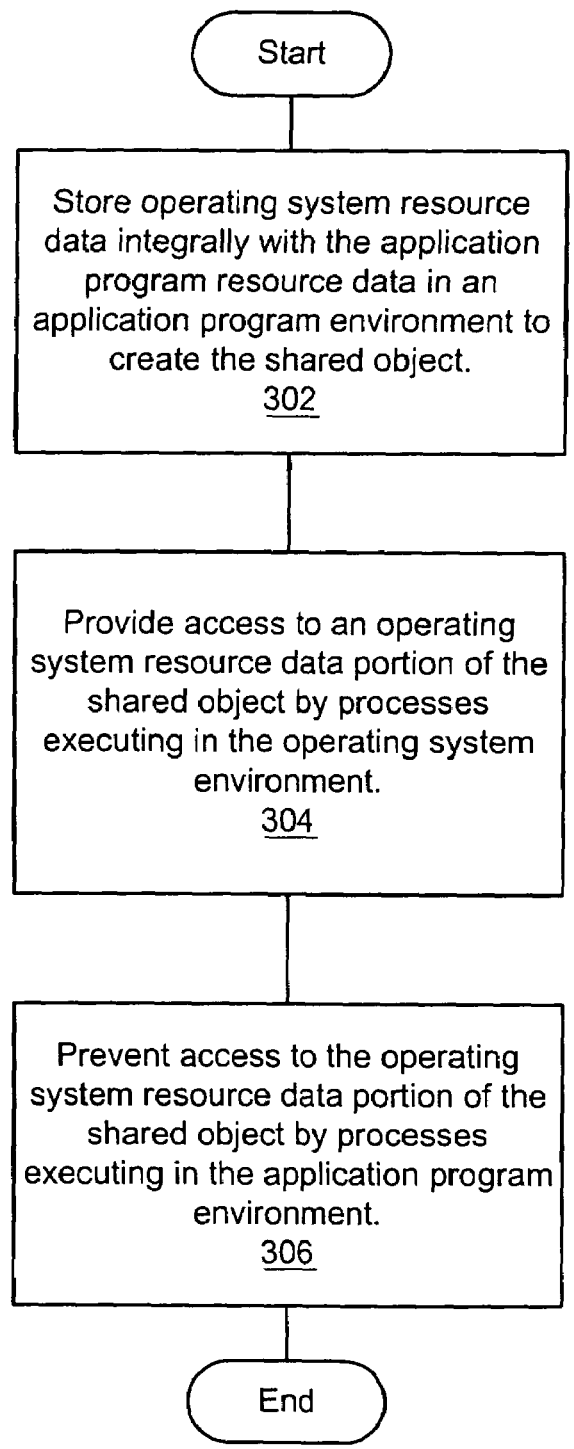
FIG. 4 is a flowchart of a method for combining operating system resource data and application program resource data in a shared object.

FIG. 4 is a flowchart of a method for combining operating system resource data 110 and application program resource data 210 in a shared object 240. At Step 302 operating system resource data 110 is stored integrally with the application program resource data 210 in an application program environment 230 in order to create a shared object 240. Access to an operating system resource data 110 portion of the shared object 240 is provided to processes executing in the operating system environment (e.g., operating system process 150) at Step 304. At Step 306 access to the operating system resource data 100 portion of the shared object 240 is prevented for processes executing in the application program environment (e.g., application program process 250).

Figure 5:
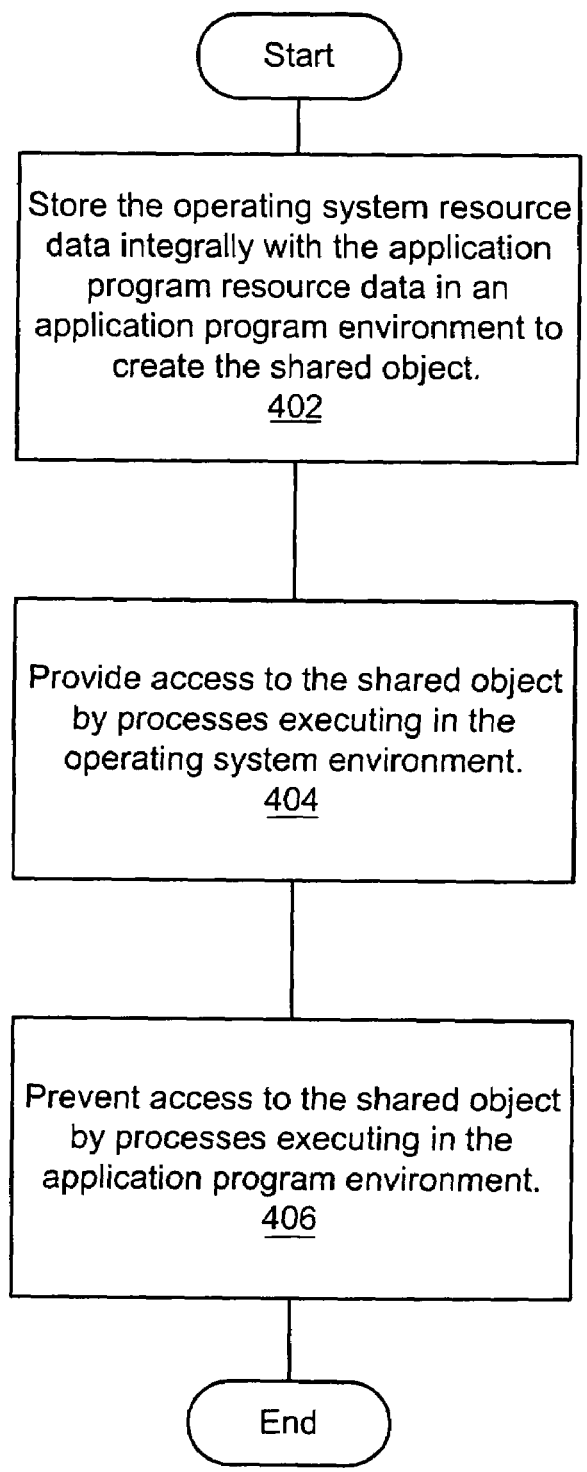
FIG. 5 is a flowchart of a method for storing operating system resource data in a shared object.

FIG. 5 is a flowchart of a method for storing operating system resource data 110 in a shared object 270. At Step 402 operating system resource data 110 is stored integrally in an application program environment 260 in order to create a shared object 270. Access to the shared object 270 is provided to processes executing in the operating system environment 160 (e.g., operating process 170) at Step 404. At Step 406 access to the shared object 270 is prevented from processes (e.g., application program process 280) executing in the application program environment 260.

Figure 6:
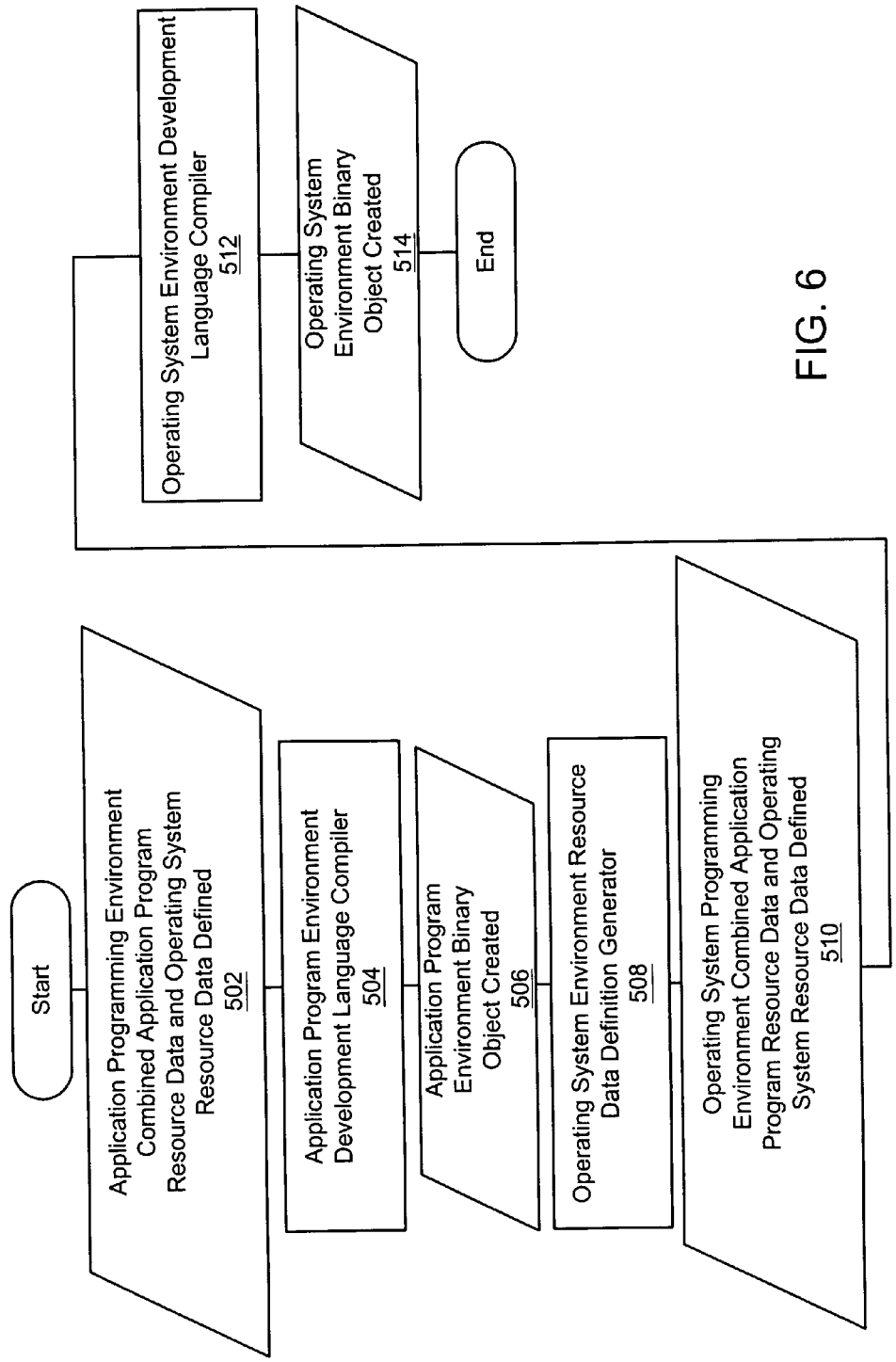
FIG. 6 is a flowchart of a method for static creation of shared object definitions.

FIG. 6 is a flowchart of a method for static creation of shared object definitions. In a preferred embodiment of the present invention, a shared object, accessible from both an operating system environment 130, 160 and an application program environment 230, is created by defining the shared object 240, 270 in the corresponding development language native to each respective environment. For example, operating system data resource 110 objects may be defined in an operating system environment development language, such as C++, while application program data resource 210 objects may be defined in an application program environment development language like Java. Appropriate environment language compilers may be used to produce operating system binary objects and application program binary objects. Shared object definitions can also be created dynamically according to the principles of the present invention.

Static creation of the shared object 240 definition comprises defining a combined application program resource data 210 and operating system resource data 110 object (e.g., shared object 240, 270 definition) within an application programming environment 230, 260 at Step 502. At Step 504 the shared object 240, 270 definition is compiled to produce an application program environment 230, 260 binary object at Step 506. An operating system environment 130, 160 definition (Step 510) is generated (Step 508) from the application program environment 230, 260 binary object. The operating system environment 130, 160 definition of combined application program resource data and operating system resource data is compiled at Step 512 to produce an operating system environment 130, 160 binary object at Step 514. In this way, both the application program environment 230, 260 binary object and the operating system environment 130, 160 binary object are used to access shared object 240, 270.

In one preferred embodiment the application program environment 230, 260 is a Java programming environment and the shared object 240, 270 is defined as a Java class in Java source code. The Java source code is compiled using a Java compiler to produce a Java binary (.class) file. The generator tool then processes the binary file to produce an operating system environment 130, 160 source code file. In one preferred embodiment a C language source code (.C or .H) file is produced defining the shared object 240, 270. That operating system environment 130, 160 source code file is then compiled to produce an operating system environment 130, 160 binary object. Both the application program environment binary object and the application program environment binary object can then be used by their respective environments to access shared object 240.

Figure 7:
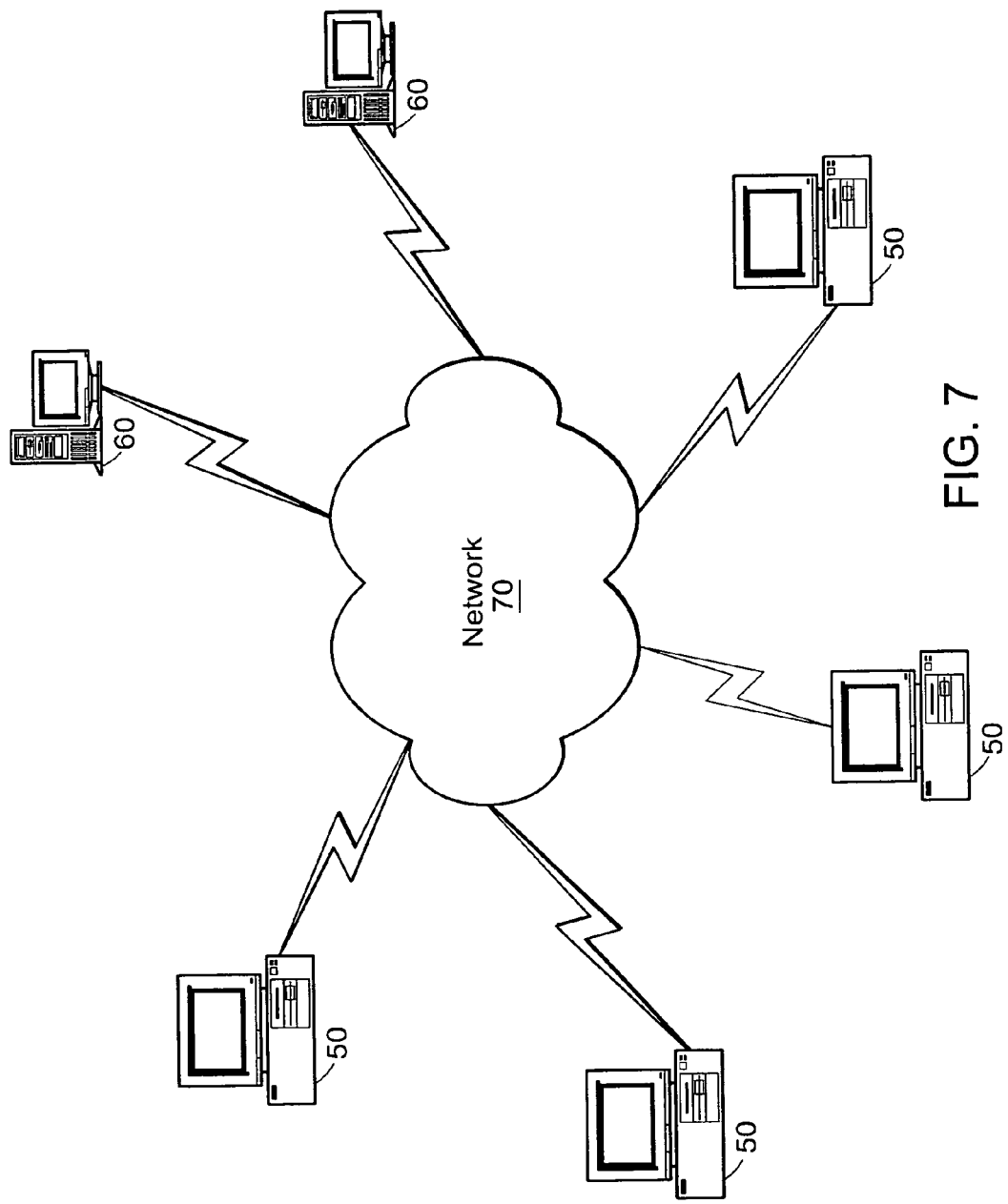
FIG. 7 is a diagram of a computer system in which an embodiment of the present invention is implemented.

FIG. 7 is a diagram of a computer system in which an embodiment of the present invention is implemented. Client computer 50 and server computer 60 provide processing, storage, and input/output devices for combining operating system resource data and application program resource data in a shared object. The client computers 50 can also be linked through a communications network 70 to other computing devices, including other client computers 50 and server computers 60. The communications network 70 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, combining operating system resource data and application program resource data in a shared object can be implemented on a stand-alone computer.

Figure 8:
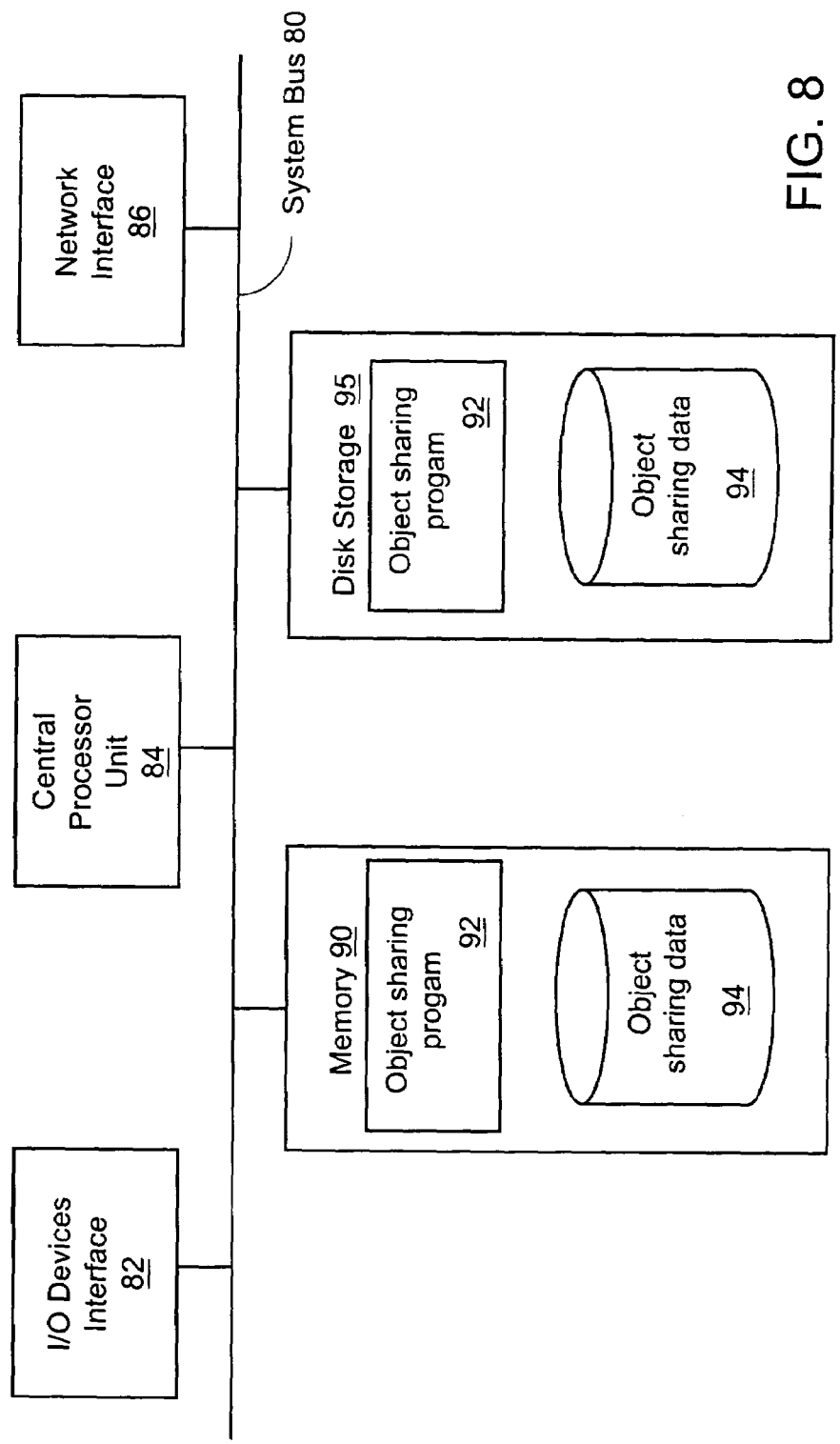
FIG. 8 is a diagram of the internal structure of a computer (e.g., 50, 60) in the computer system of FIG. 7.

FIG. 8 is a diagram of the internal structure of a computer (e.g., 50, 60) in the computer system of FIG. 7. Each computer contains a system bus 80, where a bus is a set of hardware lines used for data transfer among the components of a computer. A bus 80 is essentially a shared conduit that connects different elements of a computer system (e.g., processor, disk storage, memory, input/output ports, network ports, etc.) that enables the transfer of information between the elements. Attached to system bus 80 is an I/O device interface 82 for connecting various input and output devices (e.g., displays, printers, speakers, etc.) to the computer. A network interface 86 allows the computer to connect to various other devices attached to a network (e.g., network 70). A memory 90 provides volatile storage for computer software instructions for combining operating system resource data and application program resource data in a shared object (e.g., object sharing program 92 and object sharing data 94 used to implement an embodiment of the present invention. Disk storage 95 provides non-volatile storage for computer software instructions and data (e.g., object sharing program 92 and object sharing data 94) used to implement an embodiment of the present invention.

A central processor unit 84 is also attached to the system bus 80 and provides for the execution of computer instructions (e.g., object sharing program 92 and object sharing data 94), thus providing for combining operating system resource data and application program resource data in a shared object.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for combining operating system resource data and application program resource data in a shared object, comprising:
    storing the operating system resource data integrally with the application program resource data in an application program environment to create the shared object;
    providing access to an operating system resource data portion of the shared object by processes executing in the operating system environment; and
    preventing access to the operating system resource data portion of the shared object by processes executing in the application program environment.

2. The method of claim 1 wherein the shared object is defined statically using a process comprising:
    defining an application program resource data and operating system environment object relative to an application program environment development language;
    compiling the application program environment and operating system environment object to produce an application program environment binary object;
    generating an application program environment and operating system environment object definition in operating system environment development language, from the application program environment binary object; and
    compiling the generated application program environment and operating system environment object definition to produce an operating system environment binary object.

3. The method of claim 1 wherein the operating system resource data portion of the shared object is viewed as a valid object from the processes executing in the operating system environment and an application program resource data portion of the shared object is viewed as a valid object from the processes executing in the application environment.

4. A computer apparatus creating a shared object, comprising:
    operating system resource data integrally stored with application program resource data in an application program environment to create the shared object;
    an operating system resource data portion of the shared object accessible to processes executing in the operating system environment; and the operating system resource data portion of the shared object being prevented from access by processes executing in the application program environment.

5. The computer apparatus of claim 4 wherein the shared object is defined statically using a process comprising:
- defining an application program resource data and operating system environment object relative to an application program environment development language;
- compiling the application program environment and operating system environment object to produce an application program environment binary object;
- generating an application program environment and operating system environment object definition in operating system environment development language, from the application program environment binary object; and
- compiling the generated application program environment and operating system environment object definition to produce an operating system environment binary object.

6. The computer apparatus of claim 4 wherein the operating system resource data portion of the shared object is viewed as a valid object from the processes executing in the operating system environment and an application program resource data portion of the shared object is viewed as a valid object from the processes executing in the application environment.

7. A computer apparatus creating an operating system environment shared object, comprising:

means for storing the operating system resource data integrally with the application program resource data in an application program environment to create the shared object;

means for providing access to an operating system resource data portion of the shared object by processes executing in the operating system environment; and means for preventing access to the operating system resource data portion of the shared object by processes executing in the application program environment.

8. A computer program product comprising:

a computer usable medium for combining operating system resource data and application program resource data in a shared object;

a set of computer program instructions embodied on the computer usable medium, including instructions to:

store the operating system resource data integrally with the application program resource data in an application program environment to create the shared object;

provide access to an operating system resource data portion of the shared object by processes executing in the operating system environment; and prevent access to the operating system resource data portion of the shared object by processes executing in the application program environment.

* * * * *